United States Patent [19]
Parker

[11] 3,938,643
[45] Feb. 17, 1976

[54] MECHANISM FOR FEEDING AND TRANSPORTING BRUSH BLANKS

[75] Inventor: Russell H. R. Parker, Cleveland, Ohio

[73] Assignee: Universe Machine Company, Inc., Cleveland, Ohio

[22] Filed: May 1, 1974

[21] Appl. No.: 466,071

[52] U.S. Cl. ................................................. 198/19
[51] Int. Cl.² ......................................... B23Q 7/03
[58] Field of Search ........................... 198/19, 18

[56] References Cited
UNITED STATES PATENTS

| | | | |
|---|---|---|---|
| 2,895,354 | 7/1959 | Hawkinson et al. | 198/19 |
| 2,997,191 | 8/1961 | Finston | 198/19 |
| 3,376,968 | 4/1968 | Lott | 198/19 |
| 3,775,909 | 12/1973 | Best et al. | 198/19 |

Primary Examiner—James B. Marbert
Attorney, Agent, or Firm—Clarence A. O'Brien; Harvey B. Jacobson

[57] ABSTRACT

A conveyor or rotary index drum transport system for brush blanks. The system utilizes a series of lightweight blank receiving work holders sequentially indexed through a series of stations with selected stations incorporating means for shifting the work holder to an operative position outward of the indexing or transporting means. The transport conveyor or drum also travels through stationary loading and unloading stations.

18 Claims, 10 Drawing Figures

MECHANISM FOR FEEDING AND TRANSPORTING BRUSH BLANKS

The present invention generally relates to brush making machines, and is in particular directed to an improved system for feeding and transporting brush blanks to a series of work stations for the sequential performance of a selected series of operations which result in a finished brush.

Many mechanisms are known for the production of brushes in various stages. For example, there are machines which drill and fill brush blanks with the blanks then being transferred and reloaded in secondary machines for hot stamping, trimming, and rondating or rounding the ends of the bristles.

It is a significant object of the present invention to provide a system whereby all of the above operations, or in fact any series of operations deemed necessary so as to provide a complete product, can be performed in one machine and by one operator with only a single loading of each blank being required. This of course results in considerable economies in both time and production costs.

Another substantial difficulty encountered with previously known machines, whether incorporating conveyors or rotary indexing drums, has been the difficulty in achieving a high speed operation due to the large mass normally associated with the known devices and the inertial problems developed in connection therewith. In said previous known machines, conveyors or rotary indexing drums have been used and it has been necessary for the whole unit, conveyor or rotary drum with its loading magazine, to follow the path required in moving successively from hole to hole in a brush pattern. Furthermore any mechanism for secondary operations such as stamping, trimming and rondating would also need to be attached to and move with the conveyor or rotary drum.

In avoiding such problems, the system of the present invention utilizes individual work holders which receive the brush blanks and are so mounted on the indexing conveying unit as to, at selected operational stations, be laterally shuttled from the conveying unit to a separate working position laterally of the conveying unit where the high speed operations are performed independently of the conveying means. Upon completion of the particular operation, the work holder is reengaged with the conveying unit for an indexing thereby to the next operative position. As the individual work holders are removed from the conveying means for a drilling or filling operation and are carried on light weight slides the movements required in following a step-by-step pattern may be made at high speeds without inertia problems.

Basically, the invention herein utilizes a conveyor type of transport or an indexing rotary drum wherein work holders are carried to successive positions where they may be selectively transferred from the transport unit to a secondary holder for movement of the blank to an operative position relative to a drill or filling tool. At the completion of the particular operation, the work holder is returned to the transporting unit and advanced or indexed one station for the performance of a sequential operation thereon while a following holder mounted blank enters the previous station.

Operations at all of the stations utilized will be performed simultaneously and in accordance with the indexing sequence of the transporting unit. The operation performed at selected stations takes place laterally of the transporting unit and, generally aside from the synchronization thereof with the operations of the various other stations, is performed independently of the operations of the other stations. In this manner, any number of desired stations can be used along the path of travel of the transporting unit. By the same token, the step-by-step indexing of the transporting unit will make it possible for some operations to be performed without removing the brush from the transporting unit. For example, a trimming of the ends of the tufts can be performed by passing a trimming device across the brush as it is held in the transporting unit. It will of course be understood that all operations will be automatically performed in timed sequence with operation of the basic hole drilling and hole filling units, normally located at the first two operational stations beyond the loading station.

There are many different designs and shapes of brushes and it is a further object of this invention to provide a quick and easy means for changing from one pattern to another. For this purpose a set of brush holding devices may be provided for each different pattern to be produced and, once each set of said brush holding devices has been adjusted for pattern alignment, they may be exchanged as required without further adjustment. This will show a considerable saving in change over time as compared with known brush holders which are an integral part of a machine and which must be adjusted each time a change of brush pattern is required.

These together with other objects and advantages which will become subsequently apparent reside in the details of construction and operation as more fully hereinafter described and claimed, reference being had to the accompanying drawings forming a part hereof, wherein like numerals refer to like parts throughout.

Figure 1:
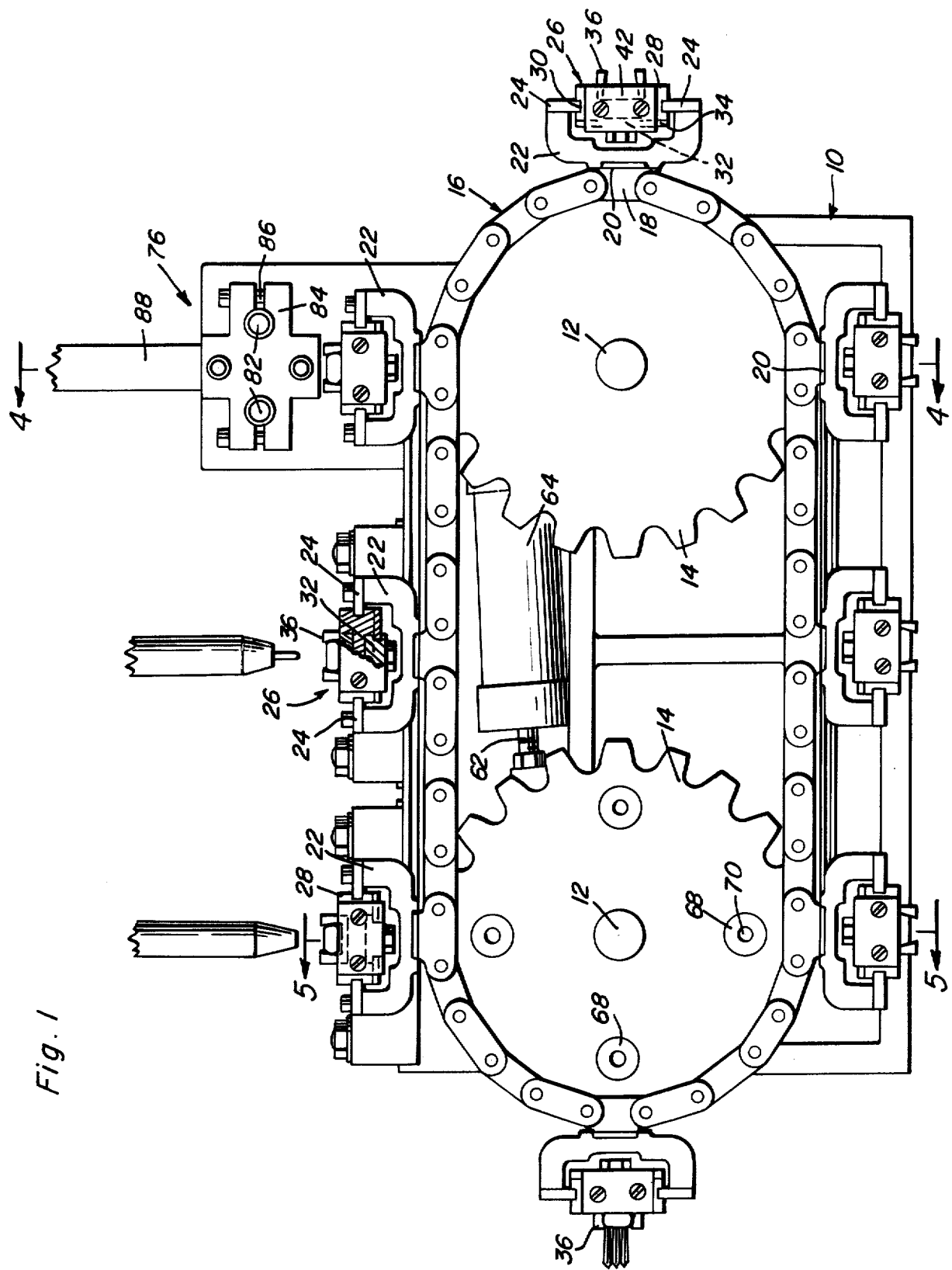
FIG. 1 is a front elevational view of a conveyor type machine constructed in accordance with the instant invention and incorporating a loading station, a drilling station and a filling station.
Figure 2:
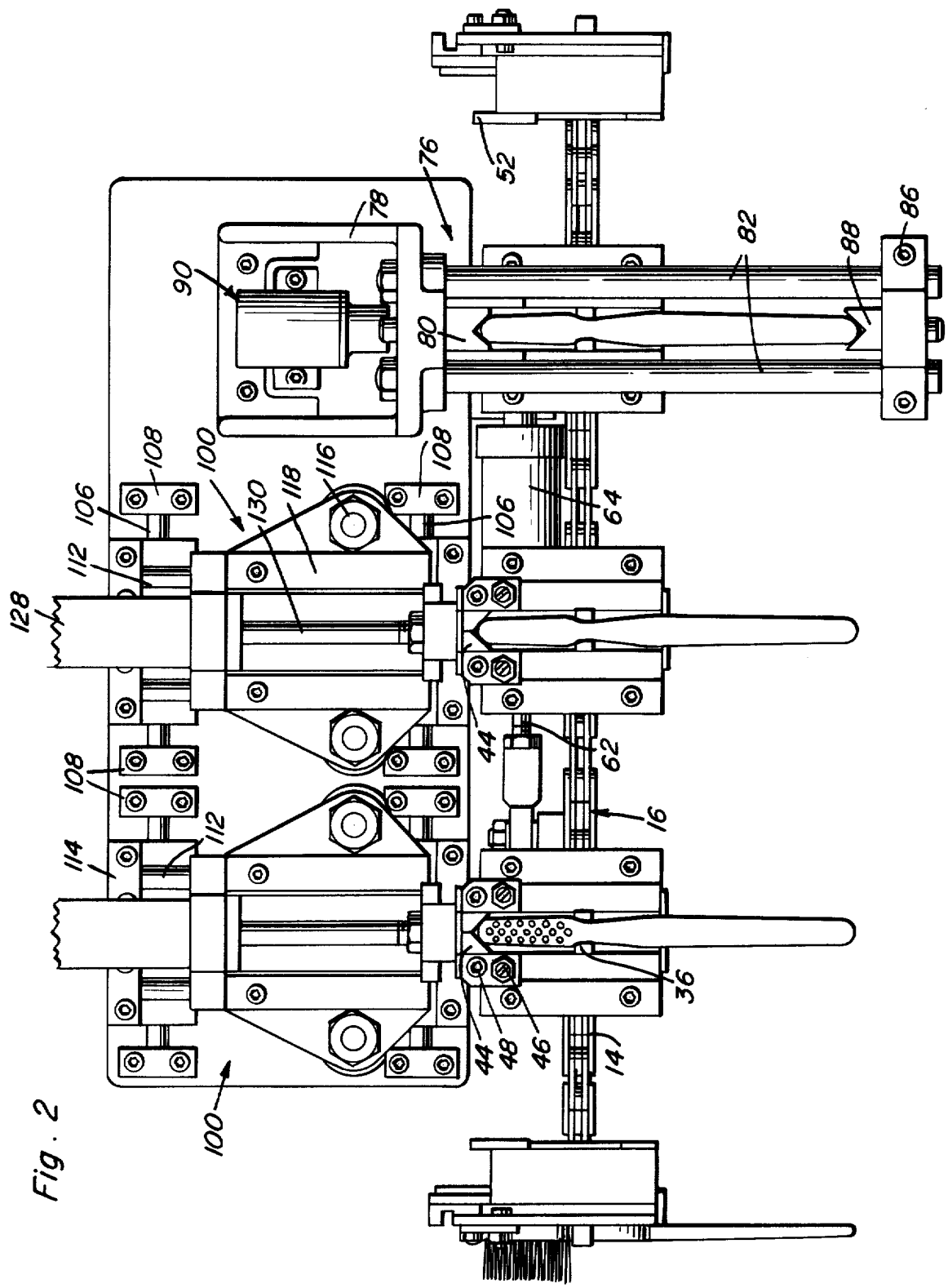
FIG. 2 is a top plan view of the machine of FIG. 1 more clearly detailing the relationship between the transporting unit and the stations.

Referring now more specifically to the drawings, reference numeral 10 is used to generally designate the structural framework of a conveyor type machine made in accordance with the instant invention. The frame 10 rotatably mounts a pair of laterally spaced parallel shafts 12, each of which has an enlarged sprocket 14 fixed to the forward end thereof for rotation therewith. An endless sprocket chain 16 is engaged about the spaced sprockets 14 for movement in an endless path upon an indexing rotation of one of the sprockets as shall be detailed subsequently.

Selected chain links 18, at equally spaced intervals along the chain 16 mount lug attachments 20. The lug attachments 20 in turn fixedly mount outwardly directed channel-shaped members 22. Each channel-shaped member 22 mounts a pair of inwardly projecting guide plates 24 along the upper edges of the channel arms. A brush or work holding device 26 is associated with each channel-shaped member 22 and includes a plate 28 having opposed edge grooves 30 slidably engaging the opposed guide plates 24. A plate 32 is slidably mounted beneath or within a recess in the bottom of plate 28 and retained therein by side plates 34 affixed to the opposed sides of plate 28 and underlying plate 32.

A clamping jaw 36 is bolted to and projects upwardly from the plate 32 at any of a plurality of positions therealong corresponding to the length of the brush blank to be clamped. This can be effected by the provision of a plurality of central bolt receiving apertures 38 along the plate 32.

The plate 32 is urged inwardly into clamping position by a pair of compression springs 40 orientated between the leading edge of the plate 32 and a spring-retaining plate 42 affixed to the forward end of the plate 28.

Adjustably mounted fixed jaws 44 are mounted at the opposite end of the plate 28. Adjustment of these jaws 44 is effected by means of eccentric studs 46 extending through the jaws and into camming slots within the underlying plate 28. These eccentric studs 46 may be rotated by engaging a screwdriver in the kerfed heads thereof to either advance or retract the jaws 44 for a corresponding movement of the brush blank whereby a proper alignment of the blank for the various work operations can be achieved. Upon a proper adjustment of the jaws 44, the jaws will be locked in their adjusted position by lock screws 48. An appropriate support bolster 50 will be provided on the plate 28 between the clamping jaw 36 and fixed jaws 44 with this bolster 50 conforming to the shape of the brush blank so that the blank is held in a firm level position during the various operating cycles, including drilling and filling.

Projecting inward from the lower rear portion of each channel-shaped member 22 is a flat support plate 52 which is received in and slides along a grooved block 54 fixed to the main frame structure so as to support the weight of the chain mounted work holder between the sprockets 14 and maintain the holders in correct aligned position for transfer at the various operational stations.

Figure 6:
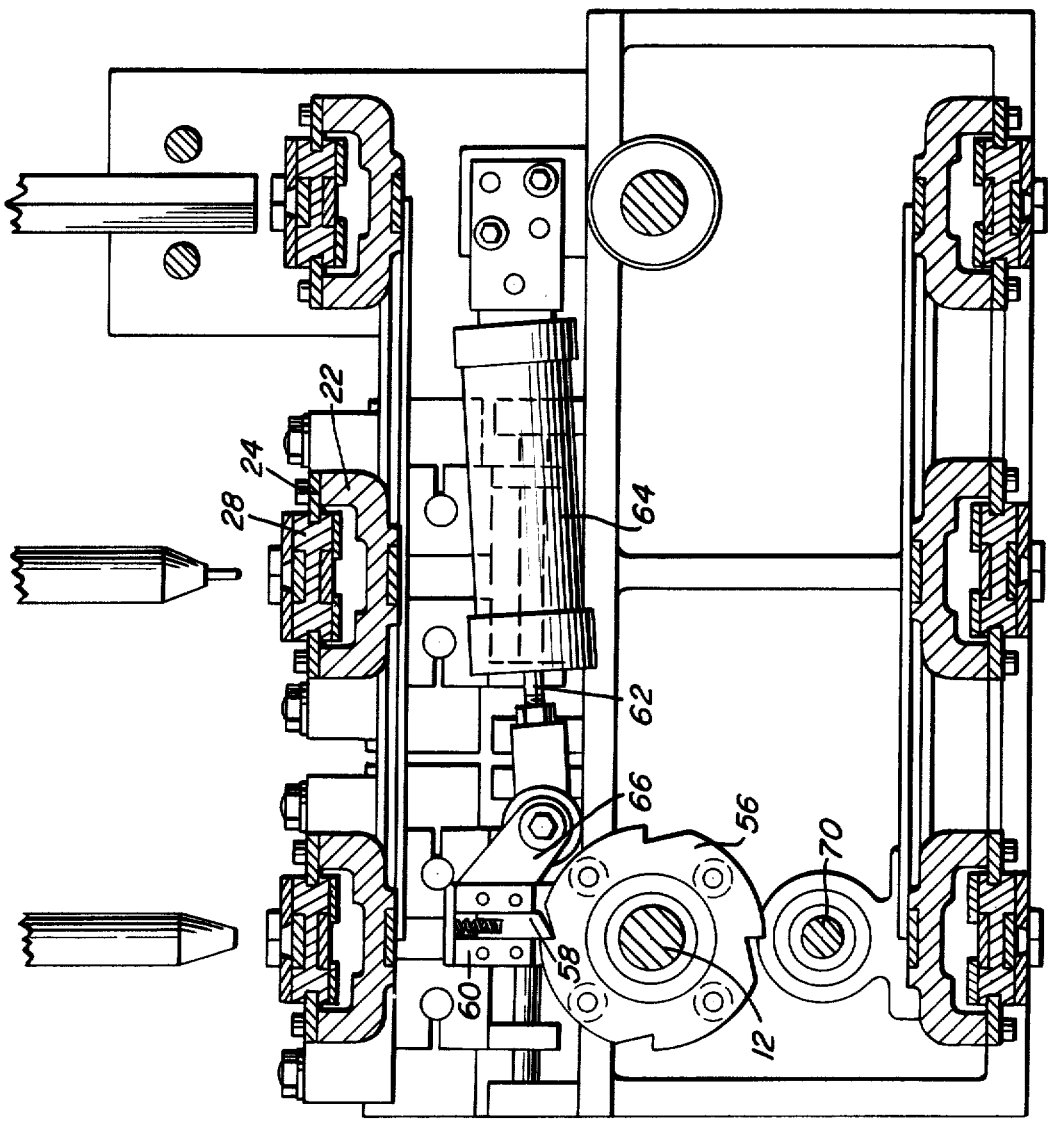
FIG. 6 is a cross-sectional detail illustrating the indexing means and taken substantially upon a plane passing along line 6—6 in FIG. 5.

A ratchet wheel 56 is fixed to the rear of the left-hand sprocket 14, note FIG. 6 in particular. A spring-loaded pawl 58 selectively engages within the ratchet wheel slots and is slidably mounted within housing 60. The housing 60 is in turn rotatably mounted on the associated sprocket shaft 12 for travel thereabout with the controlled rotational movement of the housing, pawl 58 and ratchet wheel 56 being controlled by the selective extension and retraction of a piston rod 62 relative to frame mounted cylinder 64 with the housing 60 being link connected, as at 66, to the leading end of the piston rod 62. The left-hand sprocket wheel 14 is itself provided with equally spaced locating bushings 68 for engagement therein of the leading end of a locating plunger 70 affixed to the piston rod 72 of a frame mounted cylinder 74 for a synchronized introduction into an aligned bushing and a locking of the chain transport in a predetermined position to which it is indexed by the pawl and ratchet wheel assembly.

The initial supplying of the brush blanks to the conveyor transport unit is effected through the utilization of a loading magazine assembly 76 mounted on the structural framework 10. This loading magazine assembly 76 includes a mounting bracket 78 mounting a vertically extending brush blank guide 80 and a pair of forwardly projecting laterally spaced support rods 82. A mounting plate 84 is slidably mounted on the support rods 82 and selectively fixed in position therealong by appropriate clamping screws 86. This mounting plate 84 carries a second vertically extending brush blank receiving guide 88 with this guide, through the slidable adjustment of the mounting plate 84, being so positioned relative to the first mentioned guide 80 as to accommodate the particular length of brush blank being utilized. The loading magazine assembly also includes a frame mounted piston and cylinder unit 90 so orientated as to position the leading end of the piston rod 92 in alignment with the inner end of the jaw mounting plate 32 of an aligned work holder whereby, as shall be explained subsequently, an opening of the work holder jaws will be effected automatically for the reception of a new brush blank from the loading magazine assembly.

A discharge station 94 will normally be located diametrically below the loading station designated by reference numeral 76 and will consist of a single piston and cylinder unit 96 with the leading end of the selectively projectable and retractable piston 98 aligning with the inner end of the jaw mounting plate 32 of an aligned work holder. This work holder will normally be inverted and, upon a forward sliding of the plate 32, and a release of the associated jaw 36, the completed brush will drop therefrom and free the holder for reloading as it subsequently passes to the loading station.

The individual work stations 100 are positioned at selected points alongside or adjacent the conveyor transport so as to correspond with the ratchet wheel controlled indexing travel of the transport unit. As will be appreciated, as many work stations as desired can be provided depending upon the particular sequence of operational steps to be performed on the brush blanks.

Each work station includes a secondary work receiving holder 102 orientated for an alignment of the conveyor mounted work holder 26 therewith. The secondary work receiving holder 102 is mounted for movement in two directions. In connection therewith, a slide block 104 is mounted on guide rods 106 carried by support blocks 108. Slide block 110 is in turn mounted on front-to-rear extending guide rods 112 carried by support blocks 114 attached to the slide block 104.

Vertical guide rods 116 are slidably mounted in slide block 110 and carry the secondary work receiving holder 102 at their upper ends. The upper side of the work holder 102 is recessed from front-to-rear and mounts a pair of opposed inwardly directed recess overhanging guide plates 118.

The secondary work receiving holder 102 is also provided with a central depending pillar 120 which extends through the slide block 110 and mounts a roller 122 on the lower end thereof which moves on an elongated plate 124 mounted in the upper surface of the slide block 104. Contact between the roller 122 and plate 124 is maintained by coiled compression springs 126 mounted on the lower end of the vertical guide rods 116. In the case of brush blanks with a flat tuft receiving surface, plate 124 will be flat. However, in those instances where the brush blank includes a curved tuft receiving surface, plate 124 will be curved in a complementary manner so that as sliding block 110 moves along guide rods 112 in following the brush pattern from one end to the other, roller 122, pillar 120 and work receiving holder 102 will be raised or lowered to maintain a constant position relative to the forward position of the drill or filling tool.

Mounted on the rear of the secondary work receiving holder 102 is an elongated power cylinder 128 having a reciprocating piston rod 130 projecting forwardly therefrom. The forward end of the piston rod 130 mounts a slotted block or downwardly directed formed hook 132 which engages within a complementary slot or hook forming portion 134 in the rear portion of the plate 28 of the work holder 26 as the work holder is conveyed into aligned relation with the station 100.

Figure 3:
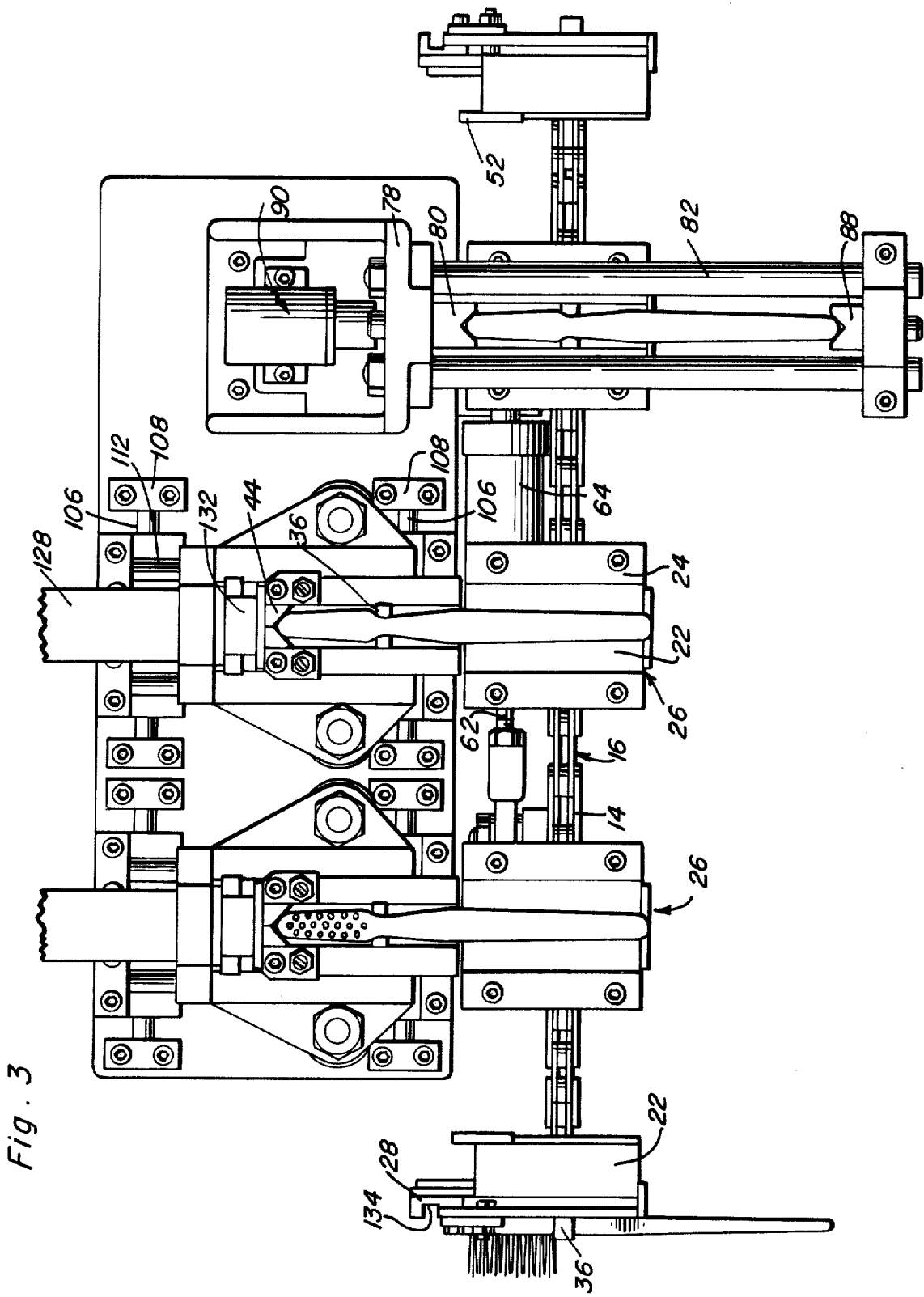
FIG. 3 is a view similar to FIG. 2 with the work holders shifted into the work stations.
Figure 4:
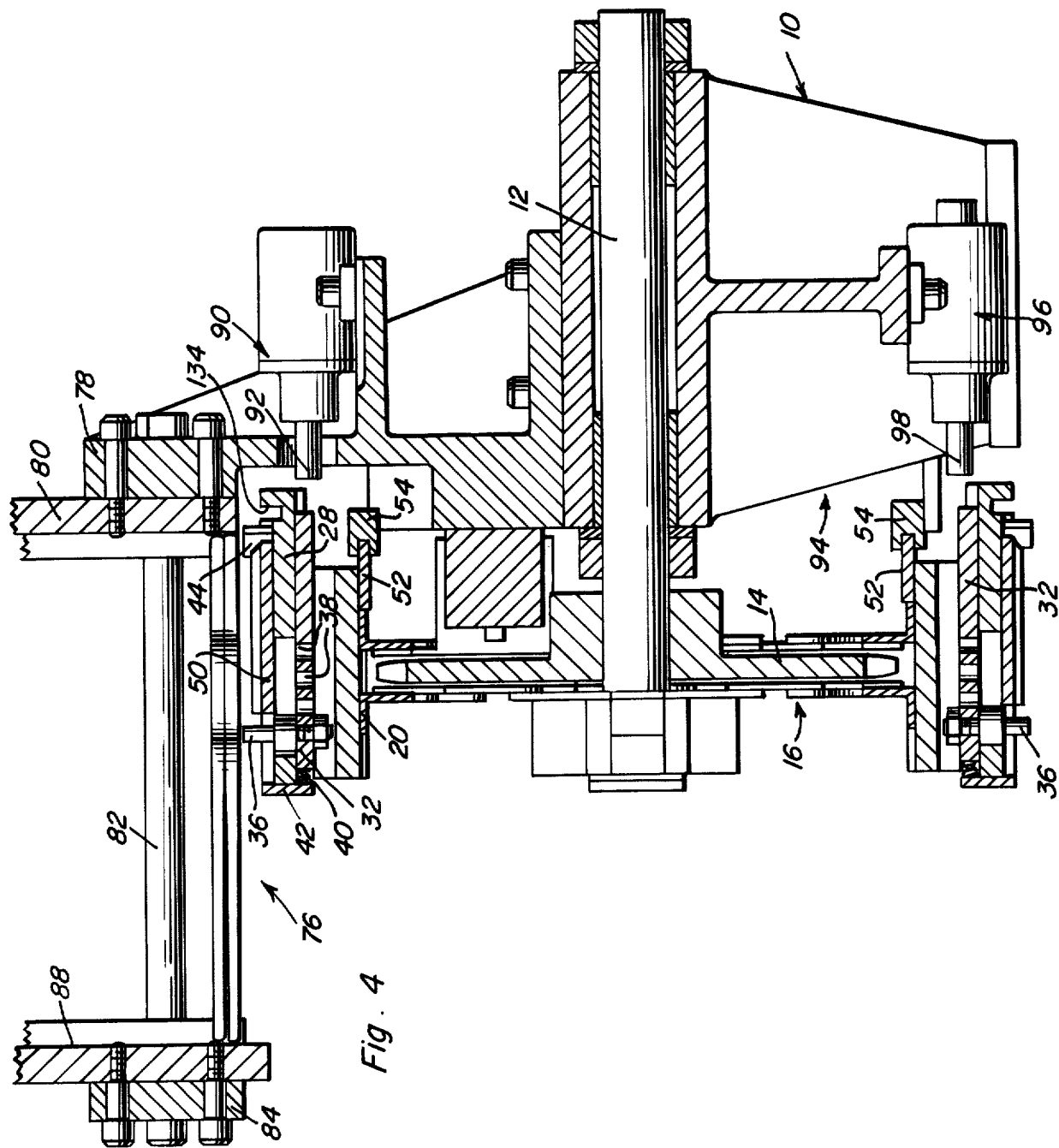
FIG. 4 is a cross-sectional detail through the loading and unloading stations taken substantially on a plane passing along line 4—4 in FIG. 1.
Figure 5:
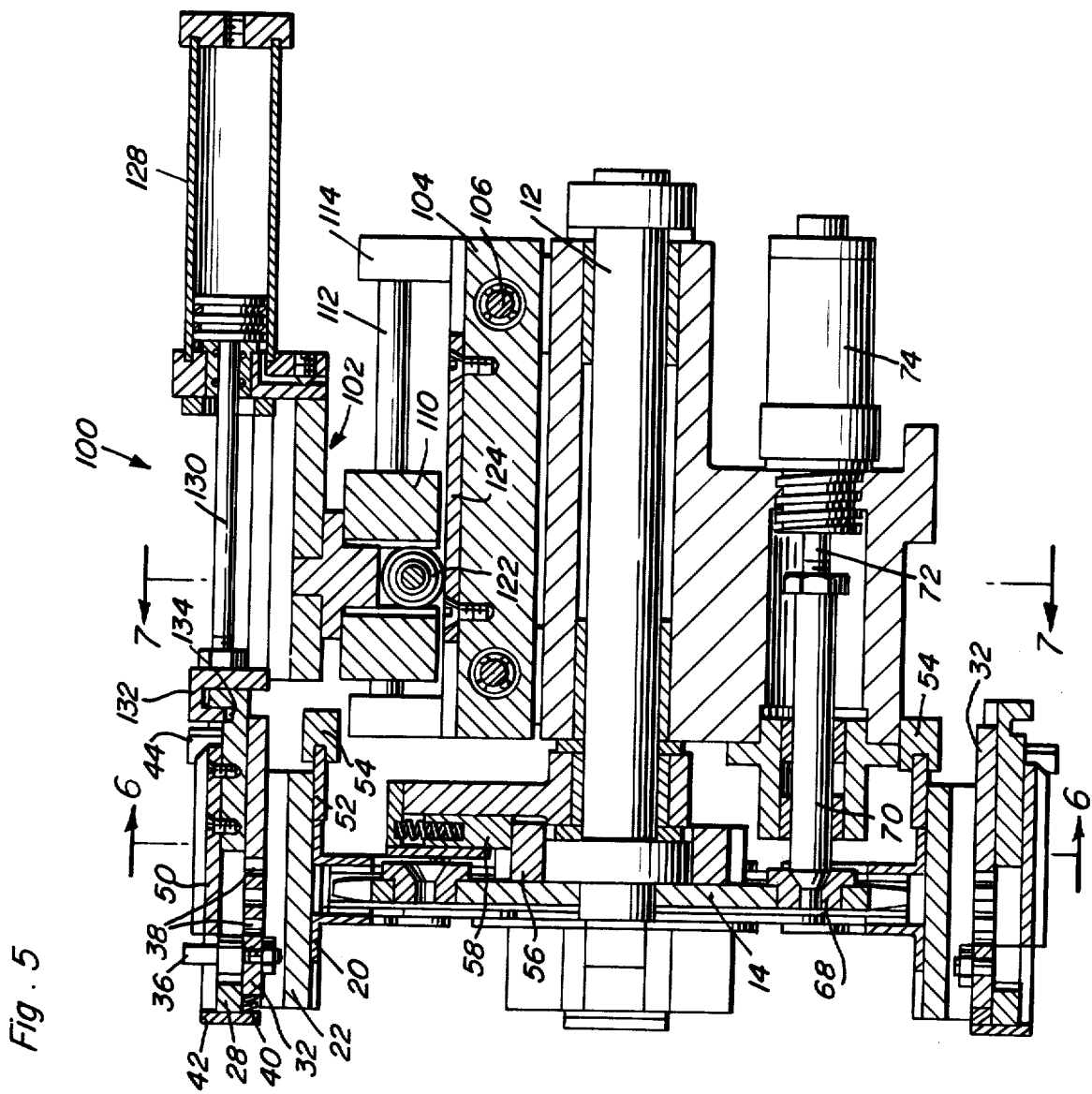
FIG. 5 is a cross-sectional detail through one of the work stations and the locating means, taken substantially on a plane passing along line 5—5 in FIG. 1.
Figure 7:
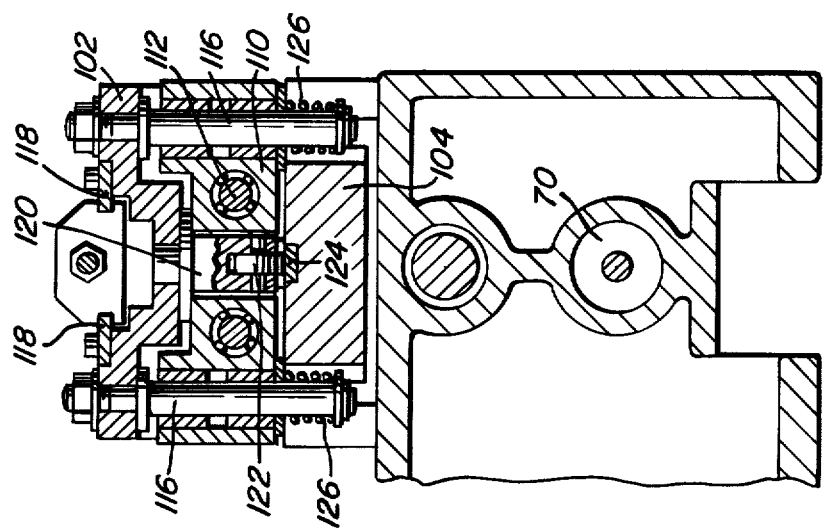
FIG. 7 is a cross-sectional detail of the operational components of a work station taken substantially on a plane passing along line 7—7 in FIG. 5.

Referring now to the manner in which the apparatus operates, it will be assumed, for purposes of illustration, that the work holder mounted blanks are within the operating stations as illustrated in FIG. 3. Turning first to the loading and unloading stations, fluid is introduced under pressure into the cylinders of units 90 and 96 so as to extend the associated piston rods 92 and 98 into engagement with the sliding plates 32. This in turn moves the clamping jaw 36 of the loading station associated work holder to an open brush-receiving position. At the same time, the clamping jaw 36 of the holder orientated in the brush discharge position is likewise opened for a discharge of the completed brush therefrom. While not detailed supra, it will be appreciated that the loading station will incorporate means so as to positively feed a single blank at a time to the aligned holder upon an opening of the clamping jaw 36 of the work holder.

The various mechanisms at the individual work stations, for example, the hole drilling device and the tufting device, both of which have merely been schematically illustrated, are put in operation. Just prior to the completion of the work cycles at the individual work stations, pressure within the cylinder units 90 and 96 is released with the clamping jaws 36 returning to their clamping position through the action of springs 40 bearing on the plates 32. In doing so, it will be appreciated that a new brush blank will be clamped within the work holder adjacent the loading magazine or station.

At the completion of the drilling, filling and other work cycles, fluid under pressure introduced into the cylinders 128 will extend the associated rods 130 and return the individual work holding devices 26 to the guide plates 24 on the conveyor chain 16. The locating rod 70 will then be withdrawn from the aligned sprocket wheel bushing 68.

The conveying or transporting unit is now set to index one station forward. This is effected by a fluid extension of the piston rod 62 effecting a rotation of the ratchet wheel 56 through the pawl 58 engaged therewith. At the completion of this one step forward indexing of the transport unit, the locating rod 70 is extended into the sprocket wheel bushing now aligned therewith. At the same time, the piston rods 130, associated with all of those stations whereat the work holder is to be laterally introduced thereto, is retracted within the corresponding cylinder 128 so as to transfer the work holding device 26 from the transporting unit to the operating station within the guide plates 118. The specific operations at the various work stations will then be performed while the piston rod 62 is withdrawn so as to retract the spring-loaded pawl for a further advancing of the transport unit. It will of course be appreciated that the sequence of operations described will be automatically performed in timed sequence with the various operating mechanisms at the work stations.

In essence, a primary difference between the apparatus herein and known mechanisms is the transporting unit coupled with the transfer of brush blanks from the transporting unit to secondary work holders for movement independently of the transporting unit during the performance of the individual operations.

Figure 8:
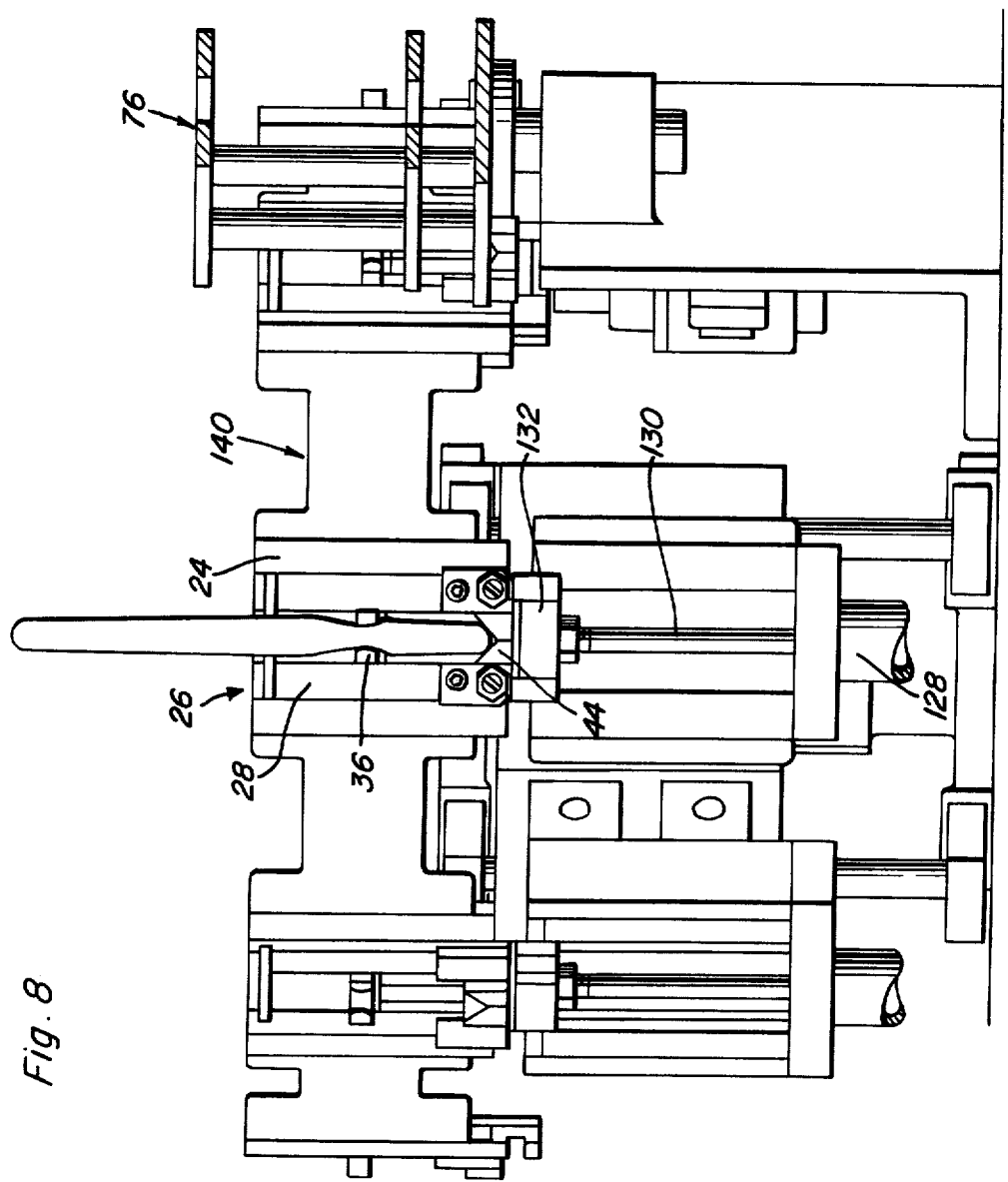
FIG. 8 is an elevational view of a rotary indexing drum incorporating the features of the present invention.
Figure 9:
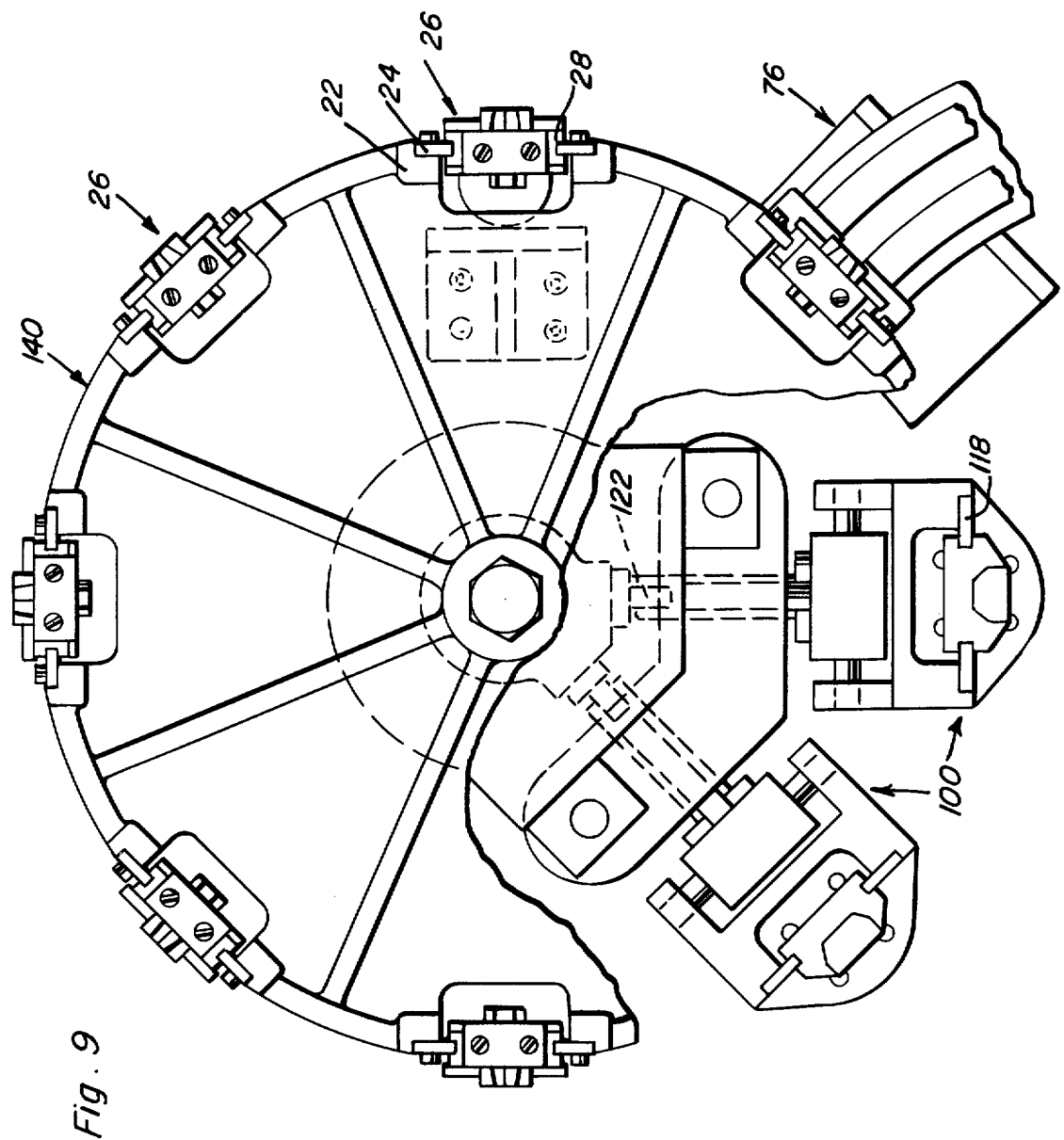
FIG. 9 is a top plan view of the machine of FIG. 8.
Figure 10:
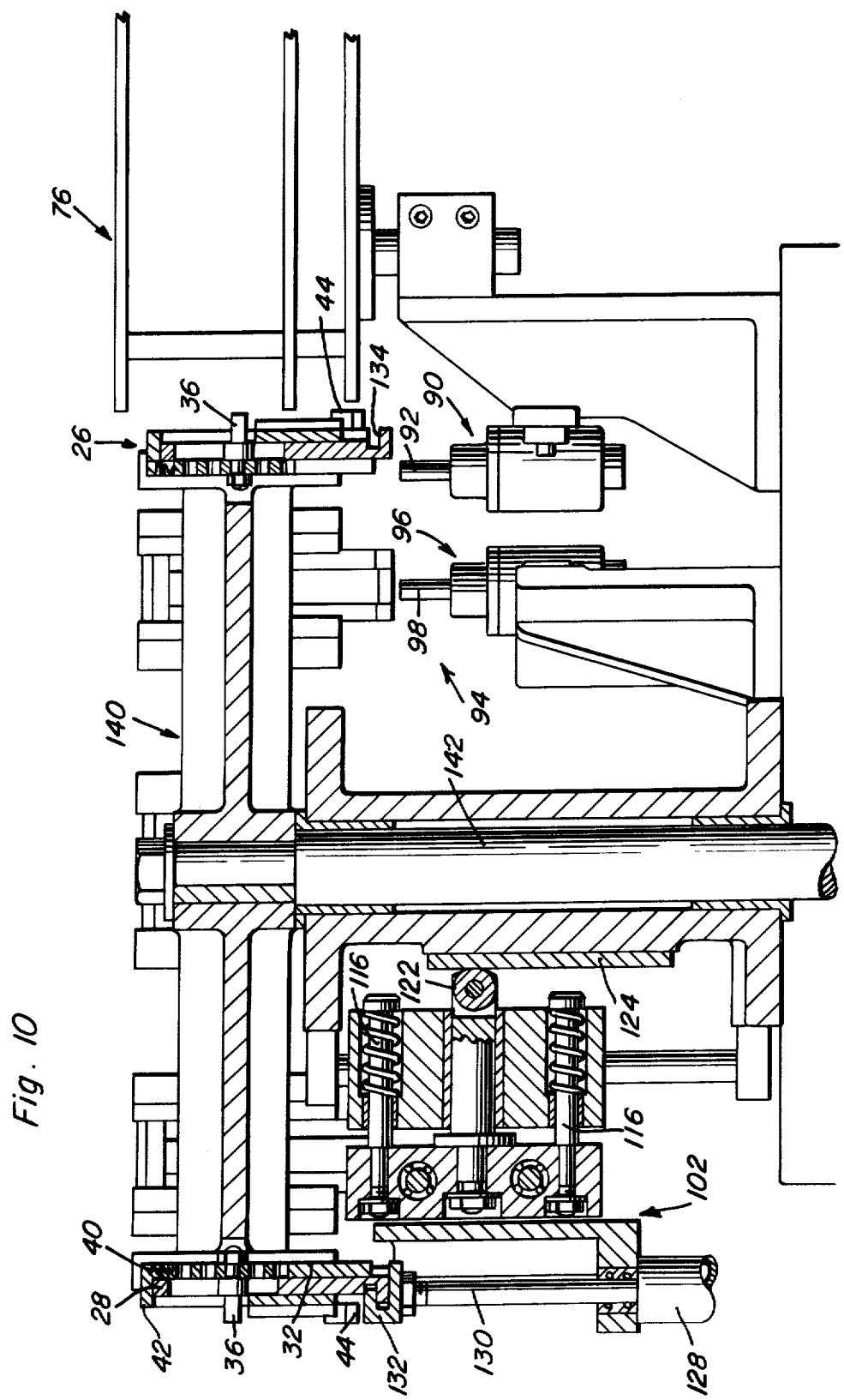
FIG. 10 is a cross-sectional detail through the machine of FIG. 8, illustrating one of the work stations and the loading station.

FIGS. 8, 9 and 10 illustrate the system or apparatus of the invention utilizing a rotary indexing drum 140 as the transport unit mounting the work holders 26 for movement between the various operating stations. The rotary drum 140, while it may be vertically orientated, will normally be horizontally orientated and affixed to the upper portion of a rotatable shaft 142 indexed or stepped around in any appropriate manner such as by means of a pawl and ratchet wheel arrangement similar to that described in conjunction with the conveyor form of the invention.

The various work stations will be orientated vertically below the work holder conveying drum with the blanks shifted vertically downward. The loading station 76 will be orientated radially outward from the drum 140 and load the brushes in a vertical position onto the aligned holders 26.

The construction and operation of the holders, work station transfer systems, and the like, are, aside from the vertical orientation thereof as compared to the horizontal orientation of the form of FIGS. 1-7, the same as that previously described. As such, like components have been referred to by like reference numerals and the previously described operational sequence equally applies to the embodiment of FIGS. 8, 9 and 10. Accordingly, no further detailed explanation of the construction and operation of the rotary indexing drum form is deemed necessary to a complete understanding thereof.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. Brush blank handling apparatus comprising a transport unit for receiving and transporting brush blanks, and a plurality of work stations positioned adjacent the transport unit at spaced points therealong, said transport unit including a carrier mounted for travel along an endless path past said stations, indexing means for moving said carrier along said path in a stepped manner, a series of work holders, each work holder adapted to receive and mount a brush blank, mounting means mounting each holder to said carrier for sequential presentation at the work stations upon an indexing of said carrier, and transfer means at one or more of said stations, said transfer means being selectively engageable with an aligned work holder for a transfer to and subsequent return from the work stations, each work station having transfer means associated therewith including secondary work receiving holders mounted for movement in one or more directions independently of the transport unit, said secondary work receiving holders being adapted for transfer of brush blank holders from and subsequently to the transport unit.

2. The apparatus of claim 1 wherein each work holder includes a blank receiving plate slidably positioned on said mounting means, opposed clamping means on said plate for the clamping engagement of a brush blank therebetween.

3. The apparatus of claim 2 wherein said clamping means comprises a fixed jaw mounted at one end of the plate, the second clamping means comprising a movable jaw spaced from said fixed jaw and mounted on a jaw plate slidably positioned on said blank receiving plate, and spring means biasing said jaw plate and movable jaw thereon toward said fixed jaw, said jaw plate including means for mounting the movable jaw at any of a plurality of adjusted positions therealong.

4. The apparatus of claim 2 wherein brush blank receiving plates are provided and pre-set for any number of different brushes and said blank receiving plates being interchangeable in the transport unit.

5. The apparatus of claim 4 wherein said transfer means comprises a reciprocating piston, hook means on the outer end of the piston, and means on said blank receiving plate automatically engaging said hook means upon an alignment of the work holder with the work station.

6. The apparatus of claim 5 including, at each work station with which transfer means is associated, said secondary work receiving holder including a first block mounted for movement in one direction, and a second block mounted on said first block and movable at right angles to the movement of the first block, and a secondary holding plate mounted on said block for a selective reception of the blank receiving plate thereon.

7. The apparatus of claim 6 including a loading station for the selective introduction of brush blanks to said carrier mounted holder, and jaw release means associated with said loading station for a selective outward moving of the movable jaw relative to the fixed jaw for the reception of a brush blank therebetween.

8. The apparatus of claim 7 wherein said jaw release means comprises a reciprocating piston engageable, upon extension, with said jaw plate for a sliding movement thereof against the biasing force of the spring means.

9. The apparatus of claim 8 including an unloading station for the discharge of finished brush blanks, and jaw release means associated with said unloading station for a selective outward moving of the movable jaw relative to the fixed jaw for a dropping of the finished brush blank therefrom.

10. The apparatus of claim 2 wherein said transfer means comprises a reciprocating piston, hook means on the outer end of the piston, and means on said blank receiving plate automatically engaging said hook means upon an alignment of the work holder with the work station.

11. The apparatus of claim 2 including, at each work station with which transfer means is associated, said secondary work receiving holder including a first block mounted for movement in one direction, and a second block mounted on said first block and movable at right angles to the movement of the first block, and a secondary holding plate mounted on said second block for a selective reception of the blank receiving plate thereon.

12. The apparatus of claim 3 including a loading station for the selective introduction of brush blanks to said carrier mounted holders, and jaw release means associated with said loading station for a selective outward moving of the movable jaw relative to the fixed jaw for the reception of a brush blank therebetween.

13. The apparatus of claim 12 wherein said jaw release means comprises a reciprocating piston engageable, upon extension, with said jaw plate for a sliding movement thereof against the biasing force of the spring means.

14. The apparatus of claim 13 including an unloading station for the discharge of finished brush blanks, and jaw release means associated with said unloading station for a selective outward moving of the movable jaw relative to the fixed jaw for a dropping of the finished brush blank therefrom.

15. The apparatus of claim 14 wherein the jaw release means associated with the unloading station comprises a reciprocating piston engageable, upon extension, with said jaw plate for a sliding movement thereof against the biasing force of the spring means.

16. The apparatus of claim 1 wherein said carrier comprises a link conveyor engaged over spaced sprocket wheels, said means for moving said carrier comprising a ratchet wheel fixed to one sprocket wheel and a piston mounted reciprocating pawl engaging and selectively rotating said ratchet wheel and associated sprocket wheel for an index moving of the conveyor.

17. The apparatus of claim 1 wherein said carrier comprises a rotary drum, means mounting said drum for rotation about a central axis, said work holders being mounted about the outer periphery of said drum.

18. Brush blank handling apparatus comprising a transport unit for receiving and transporting brush blanks, said transport unit including a carrier mounted for travel along an endless path, indexing means for moving said carrier along said path in a stepped manner, a series of work holders, each work holder adapted to receive and mount a brush blank holder, mounting means mounting each work holder to said carrier for sequential presentation at work stations upon an indexing of said carrier, and one or more secondary work receiving holders spaced adjacent the transport unit, said secondary work receiving holders being mounted for movement in one or more directions independently of the transport unit, and said secondary work receiving holders having transfer means carried thereon, said transfer means being aligned and engageable with brush blank holders on the transport unit for transfer of said brush blank holders from the transport unit to the secondary work receiving holders for movement therewith and subsequent return to the transfer unit.

* * * * *